US007694250B2

(12) United States Patent
Boutin

(10) Patent No.: US 7,694,250 B2
(45) Date of Patent: Apr. 6, 2010

(54) METHOD FOR DESIGN AND VERIFICATION OF SAFETY CRITICAL SYSTEMS

(75) Inventor: Samuel Boutin, Magny-les-Hameaux (FR)

(73) Assignee: Renault SAS, Boulogne-Billancourt (FR)

( * ) Notice: Subject to any disclaimer, the term of this patent is extended or adjusted under 35 U.S.C. 154(b) by 613 days.

(21) Appl. No.: 10/585,934

(22) PCT Filed: Jan. 13, 2005

(86) PCT No.: PCT/IB2005/050701

§ 371 (c)(1),
(2), (4) Date: Jan. 4, 2007

(87) PCT Pub. No.: WO2005/069089

PCT Pub. Date: Jul. 28, 2005

(65) Prior Publication Data

US 2007/0168096 A1   Jul. 19, 2007

(30) Foreign Application Priority Data

Jan. 13, 2004   (EP) .................................. 04300018

(51) Int. Cl.
*G06F 17/50* (2006.01)
(52) U.S. Cl. ..................... 716/5; 716/4; 716/6; 701/45; 701/48; 700/21
(58) Field of Classification Search ................. 716/4–6; 701/45, 48; 700/21
See application file for complete search history.

(56) References Cited

U.S. PATENT DOCUMENTS 5,315,972 A * 5/1994 Judy et al. .............. 123/198 D
5,365,423 A * 11/1994 Chand ......................... 700/12
5,914,845 A * 6/1999 Chase ......................... 361/111

(Continued)

FOREIGN PATENT DOCUMENTS

EP          1 100 007          5/2001

OTHER PUBLICATIONS

Torres-Pomales; Software Fault Tolerance: A Tutorial; Technical Report: NASA-2000-tm210616; Year of Publication: 2000; pp. 1-55.*

(Continued)

*Primary Examiner*—Naum B Levin
(74) *Attorney, Agent, or Firm*—Oblon, Spivak, McClelland, Maier & Neustadt, L.L.P.

(57) ABSTRACT

A method of producing a system architecture comprises identifying a set of undesirable events and ascribing to each of the undesirable events an indicator of their severity, associating the undesirable events with one or more actuators of the system architecture, developing a functional specification of an initial architecture proposed for implementation of the system architecture, refining fault tolerance requirements associated with the severity of each of the undesirable events and issuing refined fault tolerance requirements, producing replicates in the functional specification together with attached indicators of freeness of the replicates from other of the replicates, the indicators reflecting the refined fault tolerance requirements, defining a hardware structure for the system architecture, mapping the functional specification onto the hardware structure, and verifying automatically that the indicators of freeness are preserved during the mapping. The method can be stored on a computer readable storage medium or implemented by a design tool.

20 Claims, 6 Drawing Sheets

U.S. PATENT DOCUMENTS

| | | | |
|---|---|---|---|
| 5,951,619 A * | 9/1999 | Merl et al. | 701/115 |
| 6,161,071 A * | 12/2000 | Shuman et al. | 701/48 |
| 6,199,173 B1 * | 3/2001 | Johnson et al. | 714/4 |
| 6,216,252 B1 | 4/2001 | Dangelo et al. | |
| 6,647,301 B1 * | 11/2003 | Sederlund et al. | 700/79 |
| 6,789,054 B1 * | 9/2004 | Makhlouf | 703/6 |
| 6,999,824 B2 * | 2/2006 | Glanzer et al. | 700/18 |
| 7,039,474 B2 * | 5/2006 | Bonnain et al. | 700/21 |
| 7,076,350 B2 * | 7/2006 | Ivarez-Troncoso et al. | 701/36 |
| 7,260,505 B2 * | 8/2007 | Felke et al. | 702/187 |
| 7,451,063 B2 * | 11/2008 | Nelson | 702/183 |
| 2002/0111783 A1 * | 8/2002 | Kodosky et al. | 703/13 |
| 2004/0133289 A1 * | 7/2004 | Larsson et al. | 700/83 |
| 2004/0169591 A1 * | 9/2004 | Erkkinen | 340/945 |
| 2005/0113942 A1 * | 5/2005 | Longsdorf et al. | 700/79 |
| 2006/0143587 A1 * | 6/2006 | Boutin et al. | 716/18 |
| 2006/0247872 A1 * | 11/2006 | Boutin | 702/58 |

OTHER PUBLICATIONS

Torres-Pomales Software Fault Tolerance: A Tutorial; Technical Report: NASA-2000-tm210616; Year of Publication: 2000; pp. 1-55.*

Goble, William M. et al., "Extending IEC61508 Reliability Evaluation Techniques to Include Common Circuit Designs Used in Industrial Safety Systems", Proceedings Annual Reliability and Maintainability Symposium, pp. 339-343, 2001.

Suyama, Koichi, "Systematization of Reliable Control", Proceedings of the American Control Conference, vol. 1of 6, pp. 5110-5118, 2002.

Scheidler C et al., "Systems Engineering for Time Triggered Architectures", SETTA-Final Document, pp. III-VI and 7-76, 2002.

* cited by examiner

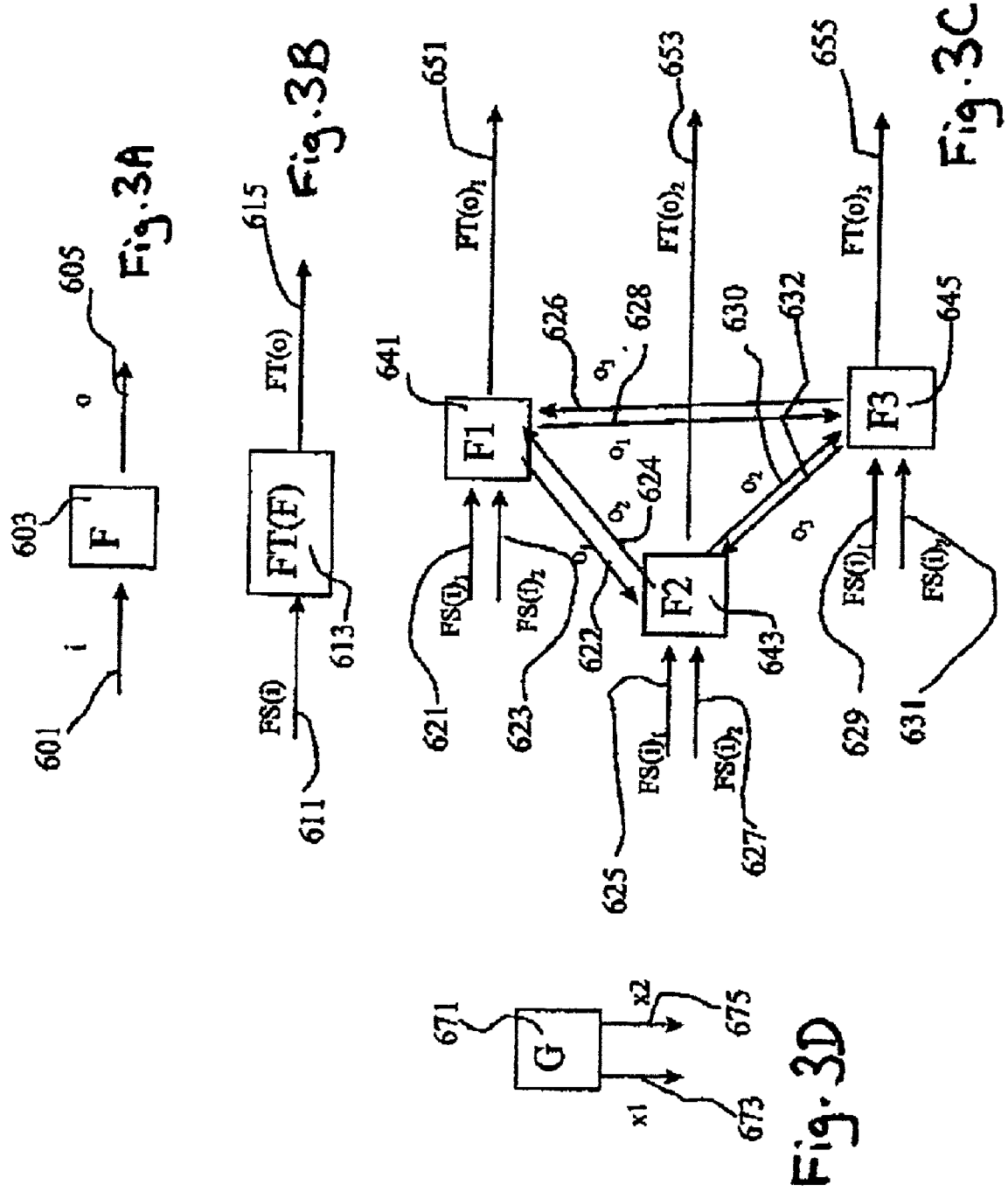

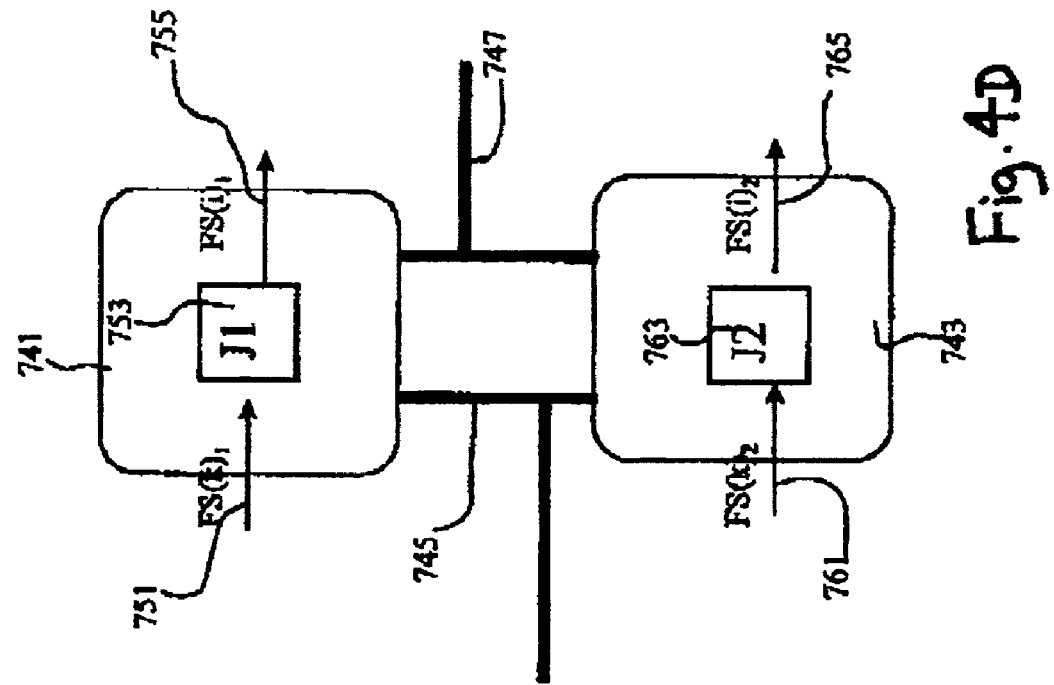
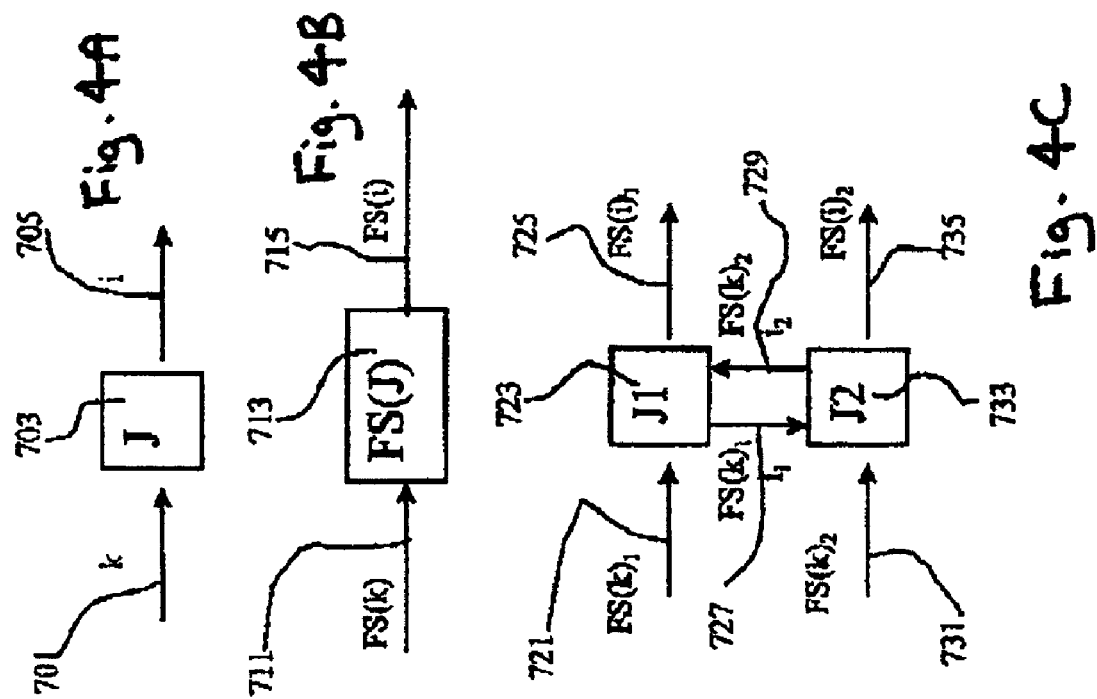
Fig. 4A
Fig. 4B
Fig. 4C
Fig. 4D

METHOD FOR DESIGN AND VERIFICATION OF SAFETY CRITICAL SYSTEMS

FIELD OF THE INVENTION

The present invention relates to system design and in particular to a method and technical aids for the design and verification of safety critical systems.

BACKGROUND TO THE INVENTION

Many fault tolerant systems, up to now, have been built upon so called fault-tolerant frameworks on which general properties are proved and then installed. Such frameworks may be the basis for nuclear plants, trains or airplane control.

Such frameworks are not scalable or flexible and are very expensive because they rely on a high level of hardware redundancy and have hardware prerequisites, for instance a dedicated bus driver or other components, (in particular verified micro-controllers with preexisting pieces of software). They are not adapted for large series production where cost optimization is a major issue.

Attempts are being made to realize virtual prototyping, one example of which [SCHEID02] is embodied in the approach referred to as "Systems Engineering for Time Triggered Architectures" (SETTA). This can be found via the URL: "http://www.setta.org", one of whose publications is by Ch. Scheidler et al: "Systems Engineering for Time triggered Architectures, Deliverable D7.3, Final Document, version 1.0", XP-002264808, 18 Apr. 2002.

The time-triggered protocol (TTP) framework [Kop96] is a good example of a safety framework built for embedded electronics applications. It answers to a certain extent the flexibility and scalability mentioned above, but only at the level of communication between nodes.

In all the examples above there is a common point,: in that a general safety critical framework is set and the design of an application must be made within the framework and under the specific rules of the framework. The safety proofs are achieved for the whole framework and not for a particular instance of the framework. For instance, in the TTP framework, at least four nodes are required for "normal"[1] behavior of the system, and mapping four instances of a process on the different TTP nodes will guarantee that the results of these processes will be available in time and correct for the consumers of these processes. The idea is that a general proof exists for the physical architecture and that this proof specializes for the many instances of safety dataflow and functions embedded in the system.

To give another idea, there is a citation in [Rush95] describing a project in which a safety critical framework, SIFT, has been designed:

"In the SIFT project, several independent computing channels, each having their own processors operate in approximate synchrony; single source data such as sensors are distributed to each channel in a manner that is resistant to Byzantine (i.e. asynchronous) faults, so that a good channel gets exactly the same input data; all channels run the same application tasks on the same data at approximately the same time and the results are submitted to exact-match majority voting before being sent to the actuators".

This is a good illustration of a safety critical framework. Note however that, in the paragraph below in that publication, the application is not even mentioned. It seems that the framework could be used for a nuclear plant, a space shuttle, or even a coffee machine. So even if the SIFT framework has been built to support a flight control system, the designers wished to design a framework with "good" safety properties on which they could design their safety critical application following fixed replication, communication and voting rules.

In the document "Extending IEC-61508 Reliability Evaluation techniques to Include Common Circuit Designs Used in Industrial Safety Systems", W. M. Goble et al., the analysis methods described in the IEC-61508 and ANSI/ISA84.01 standards are discussed. The actual effect of particular failures are considered with respect to their effect on the circuit functionality from a safety perspective and indicators of that severity are ascribed. Once assigned, the severity indicators are fixed.

It can therefore be seen that there is a continuing need for improved methods for designing and verifying a safety critical system, which method allows the optimization of a hardware architecture in that system.

SUMMARY OF THE INVENTION

It is an object of the present invention to provide an improved method and technical aids for the design and verification of safety critical systems, and in particular to provide an improved method of producing a system architecture for a plurality of electrical devices connected to each other.

Accordingly, the present invention provides a method of producing a system architecture comprising a plurality of electrical devices connected to each other, said system preferably comprising a fault tolerant system, the method including:

a) identifying a set of undesirable events and ascribing to each of said undesirable events an indicator of their severity;

b) associating where possible each said undesirable event with one or more actuators of said system architecture;

c) developing a functional specification of an initial architecture proposed for implementation of said system architecture, said functional specification of said initial architecture including dataflow for and between components thereof, said components comprising for example sensors or actuators, characterized in that the method includes:

d) refining on said functional specification the fault tolerance requirements associated with the severity of each said undesirable event and issuing refined fault tolerance requirements of said functional specification;

e) producing replicates in said functional specification together with attached indicators of independence of said replicates, said indicators reflecting said refined fault tolerance requirements;

f) defining a hardware structure for said system architecture, e.g. a series of electronic control units connected to each other by networks;

g) mapping of said functional specification onto said hardware structure; and h) verifying automatically that said indicators of independence are preserved during mapping.

The refinement of the fault tolerance requirements contributes to the advantages offered by the present invention and in particular to it being a scalable process for the design and verification of a system architecture.

The method may include, preferably in step (c), defining a series of modes of operation, e.g. nominal and limp-home modes.

The method may include specifying said series of modes in the form of one or more state charts.

The method may include mapping geometrically hardware components and/or wiring and then verifying automatically that said indicators of independence are preserved by said geometrical mapping.

The method may include specifying severity in the form of probability of failure per unit of time. The method may include outputting a set of data for manufacturing said system architecture. The architecture may comprise an architecture for a vehicle, for example a safety critical architecture such as control circuitry for a brake system.

The present invention also provides an article of commerce comprising a computer readable memory having encoded thereon a program for the design and verification of a system architecture, the program including code for performing the method of the present invention.

The present invention also provides a computer program product comprising a computer readable medium having thereon computer program code means, when said program is loaded, to make the computer execute procedure to design and verify a system architecture, said procedure comprising:

a) identifying a set of undesirable events and ascribing to each of said undesirable events an indicator of their severity;

b) associating where possible each said undesirable event with one or more actuators of said system architecture;

c) developing a functional specification of an initial architecture proposed for implementation of said system architecture, said functional specification of said initial architecture including dataflow for and between components thereof, said components comprising for example sensors or actuators, the procedure being characterized in that it includes;

d) refining on said functional specification the fault tolerance requirements associated with the severity of each said undesirable event and issuing refined fault tolerance requirements of said functional specification;

e) producing replicates in said functional specification together with attached indicators of independence of said replicates, said indicators reflecting said refined fault tolerance requirements;

f) defining a hardware structure for said system architecture, e.g. a series of electronic control units connected to each other by networks;

g) mapping of said functional specification onto said hardware structure; and h) verifying automatically that said indicators of independence are preserved during mapping.

The present invention also provides a design tool adapted for the design and verification of a system architecture, said design tool being adapted to implement the steps of the method of the present invention, or programmed using a computer program product according to the present invention.

BRIEF DESCRIPTION OF THE DRAWINGS

FIGS. 3A to 3D describe the tagging stage of he functional architecture and the expansion of the tags into replicates and side conditions in accordance with the method of the present invention;

FIGS. 4A to 4D describe the mapping of fault-tolerance requirements onto a hardware architecture in accordance with a stage in the method of the present invention;

DETAILED DESCRIPTION OF A PREFERRED EMBODIMENT

Figure 1A:
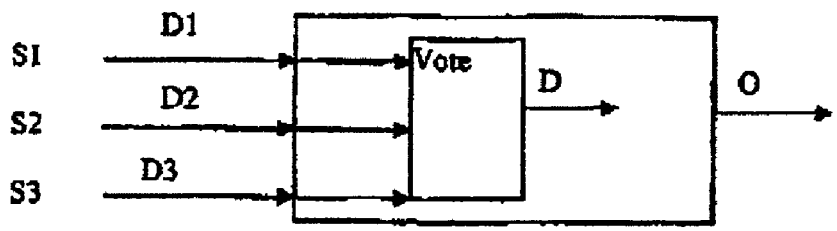
FIGS. 1A and 1B are schematic and graphical diagrams of the replication of a sensor having a certain fault tolerance requirement.

The present invention will now be described by way of example only, with reference to certain embodiments and with reference to the above mentioned drawings.

Safety of mechanical components is achieved through the mastering of their physical and chemical properties: this is what we call "material resistance", a well advanced domain of knowledge with a vast experience. Safety of electronic components can be achieved through redundancy and voting, although a proof of the level of reliability of the result may prove less convenient to obtain than may be possible in the world of mechanical components.

Reference will be made to the term "replicate" and its derivatives. Replicates in general terms are the implementation in space or time domains of redundancy of process dataflow and hardware devices. For instance replicates of a sensor may be physical copies of the sensor having the same structure and functionality, e.g. another component produced off the same production line. Replicates of a dataflow may be another dataflow carrying information which is the same as the information of the replicated dataflow at a precision and sampling rate sufficiently accurate to meet the design tolerances of the system in question. Replicate information may be only partial in cases where the only purpose of replication is to guarantee that the information is sound. For instance a cyclic redundancy check (CRC) may be considered as a partial replicate in space of the program checked.

We will distinguish in the present application between functional replicates, when the designers provides different mechanism to compute the same value, and replicates obtained by copying exact or partial information from a unique source. We will consider that functional replicates are dealt with in the functional architecture before any replicates of same source are performed. Our invention deals mainly with replicates from the same source but also takes into account requirements coming from functional replicates.

As replication in time and space is the favored tool in improving reliability of a computation, it is also necessary to gather together the replicated information and to decide a correct value among a set of process results, each of which may be faulty. This gathering consists all the time in some kind of voting, either in space or time. Different algorithms exist for voting and we assume that a particular algorithm is selected for each kind of vote (between two, three or four replicates; and for a fail-silent, or a fault-tolerant computation). Note that redundancy may be used under different forms: redundancy in space, time and more or less tricky combinations of both. We need redundancy when it is not possible to assume that a high level of safety of a particular electronic component is achievable. We shall now talk about safety of a set of replicates.

Faults may be symmetric or asymmetric. Asymmetric faults are also known referred to as "Byzantine". In the case where different electronic control units receive replicates of the same information (whether from different sources or not), we call "agreement" the fact that those electronic control units communicate together to check that they actually got the same information. Agreement is also known in the art as "consensus". "Byzantine agreement" is specified in the context of communication between processes. Imagine process A starts with initial value "1", process B starts with initial value "0" and process C starts with initial value "0". The overall process wants to converge on the same value, so each process transmits its initial value to the two others in order to make eventually a majority voting and converge to the same value. If A and B are correct, they will transmit respectively "1" and "0". Saying that C is Byzantine, means that C may send wrong and non symmetric information to A and B. That's the reason why asymmetric stands for Byzantine. For instance C may transmit "0" to A and "1" to B. In that case, A who is working properly, will receive "0" from B and C and will conclude "0". B who is working properly will receive "1" from A and B and will conclude "1". So as a conclusion, three non faulty processes do not reach consensus in one round in presence of one Byzantine failure. However, after a few rounds, a consensus can be reached if the time constraints allow affording these supplementary rounds.

Typical Byzantine sources of error are current measures in presence of a transient short circuit or inductive effect. Depending on exactly when sampling is performed, the actual signal could be high or low by different captures in the same period of time.

Another typical Byzantine source are the clocks in the context of a synchronization algorithm. Due to quartz jitters and communication delays, a clock may send contradictory information to other clocks.

Byzantine faults (also called asymmetric faults) require a high level of redundancy in order to reach consensus in one round. Most of the time however, asymmetric faults are not considered in the design because they are mostly transient and can be neglect when working on "macroscopic" physical values.

Whether we decide to consider asymmetric faults or not, the method of the present invention applies equally. Only the number of replicates and the redundancy "strategy" differ from symmetric faults. Examples of symmetric faults are a communication bus "off", a micro-controller shutdown or crash, a burned fuse and, perhaps more generally, any "dead" electrical component.

Electronics safety architectures have been built and tuned for particular physical architectures and application domains. As discussed, nuclear plants, trains and airplanes are example of costly systems designed by highly skilled engineers, which are neither flexible nor sizable. For these systems, a hierarchical approach has traditionally been used, at the device level first and then at the software level. The idea is to identify physical devices with objectives and then provide rules to write the software in each node.

Determinism is a very comfortable property for safety critical systems and, as determinism is idealistic, we consider "replica determinism" which means that the different replicates of a component should always visit the "same state" during a period of "real" time. "Real" time here is a theoretical notion that "same state" stands for "sufficiently close to be considered equal" as we deal with physics and not mathematics. To achieve replica determinism, most existing safety systems are time-triggered. The idea of a global clock allows skipping a complete category of faults: time faults. Having a completely synchronous approach allows a "divide and conquer" approach by first living in a world where time faults are fixed and then fix precision faults. In fact, determinism is a mandatory property of safety critical frameworks because such framework would be nearly impossible to design in the absence of determinism, whose design and proof could be too difficult.

A 1985 paper, "Impossibility of distributed consensus with one faulty process" argued that if no assumption is made about the communication rate between different distributed processes (which means they run on different CPUs at different frequencies) then the consensus problem cannot be solved. The conclusion of this paper is that some synchronization means are necessary when designing a system where exchanges between processes are not synchronized: at least an assumption about clock speed is expected. Hopefully, this is always the case in embedded applications so that it is not, at least theoretically, impossible to design asynchronous fault-tolerant systems.

Confinement is another very important property of safety critical frameworks, a general and expensive rule is to avoid mixing systems with different fault-tolerance requirements under the assumption that a system which is not fault-tolerant will be developed with less care and that it is not acceptable that a mistake in the design of an unessential function be the reason of a safety system failure.

Failures are often temporary or even transient. A faulty component may be non faulty after a period of time. Hot reset of an electronic control unit (ECU) is a good example. If for some reason an ECU is not working properly, it is generally possible to reset this ECU and make it works properly again even while the system is in operation. This means that a failure may be only temporary. So failure probabilities are specified per unit of time and this covers both definitive failures and temporary failures.

Related to the notion of temporary faults, diagnosis can then be seen as a way to reinforce dynamically the reliability of a component or of a system, it also allows changing the kind of failure of a component. For instance, an electronic control unit can detect that it doesn't work properly or that another ECU does not work properly and can then trigger a hot reset. Diagnosis may allow converting a constant error into a temporary error. For the purpose of our application, we will consider diagnosis as a part of the application or as a way to meet requirement on the functional architecture.

Another classical technique of safety critical design systems is the implementation by different sources. Although there are well known examples of development of a software containing the same design faults, because the development teams had had the same ideas, the technique is recognize as a very strong means to avoid design errors. This applies equally to hardware; we should avoid using the same microprocessor on different nodes of a safety-critical system. On one hand, this extends the probability that one of the processors will fail, but the probability that two processors fail at the same time is far lower.

We will not address design faults as defined in [Rush95]. An example based on design faults would be the wrong control law for braking management which, under certain circumstances, may lead to no braking at all. Rather, we will focus on the question of implementing correctly a sound functional design. Implementation of replicates by different sources is an excellent way to cope with design faults.

It will be appreciated that in a so-called fail safe system, there exists a mode of operation in which the system may loose some or even all of its functionality still leaving the user able to operate the equipment or moving the equipment into a predetermine condition defined as being safe. For example, lorry brakes may be held in the off position by a pressurized air-system. If there is a failure in the air-system, e.g. broken pipe, the air would escape and the brakes would come on, which has been predefined as a safe condition even though it doesn't leave the user able to operate the lorry.

In a fail-operational system, no mode exists in which the system may loose some or even all of its functionality still leaving the user able to operate the equipment or moving the equipment into a predetermine condition defined as being safe. In a fail-operational system, a minimum level of service is required.

A fail-silent component is a component that becomes silent in the occurrence of a fault in the system in which the fail-silent component is embedded. This is a qualitative definition. This definition turns out to be quantitative if we specify the probability under which the fail-silent component should not become silent in case of a failure. For instance we may talk about a fail-silent component which may be silent in case of a fault with probability below $10^{-9}$ per hour of operation. A fail-silent component may be fail-silent in the occurrence of two faults. When we say simply fail-silent, it is in the occurrence of one fault.

A fault-tolerant component is a component which may achieve a level of service even in the occurrence of a fault in the system in which the fault-tolerant component is embedded. The definition extends to the case where the number of faults and the probabilities are specified as in the case of a fail-silent component.

In Safety critical system design, e.g. fail safe or fail operational systems, we consider mostly fail-silent actuators. This means fault tolerance at the system level should be able to take into account at least one or two silent actuators. If an actuator cannot be proved fail-silent, we may provide system compensation to a failure of such an actuator. For instance, it is possible to estimate an abnormal braking force of one of the brakes on a car whose direct consequence would be a loss of the vehicle stability. This cannot be accepted. However, applying an equivalent braking force on the opposite wheel may lead to a level of braking different to that requested but substantially equal in distribution across and axle, something which is not desirable in itself but which is clearly likely to be more acceptable from the safety point of view than uneven brake force distribution. Such usually temporary modifications to the normal function are often referred to as a limp-home mode. Fortunately for many electrical components, it's almost always possible to ensure a fail-silent behavior. It is sufficient to guarantee that the actuator be passive in case the current is cut off. This is typically the solution granted for the ABS control.

In the field of automotive applications, due to large series production, we get a quantitative measure of the components reliability which is really excellent and sufficient to prove a high level of reliability when using redundancy. Unfortunately, another stringent constraint is cost which prevents unnecessary redundancy, especially at the hardware level which converts so promptly into recurring costs. The field of application for safety critical systems like Brake-by-wire or Steer-by-wire is particularly adapted to the process of our invention as we provide a flexible trade-off between cost and safety and also can base the method of the present invention, by which we produce our design, on realistic components reliability which is a definitive advantage over systems designed in the avionics or train transportation domains.

According to the method of the present invention, we do not consider the correctness of a piece of code and how faithfully it encodes a mathematical function. It happens that when dealing with control laws of a safety system, it is generally affordable to process software and communications at a pace well over the frequency of the physical system controlled so that delay and precision of signal processing are not issues. When this is not the case, the optimization may be far more difficult but our process remains sound despite the fact that the safety requirements may seem more difficult to meet.

In our design process, we do not distinguish between time faults and value faults because we consider that both are precision faults. The sensor case is especially interesting to discuss redundancy and voting and how time faults and value faults may be handled the same way. By way of explanation, we shall now consider with particular reference for the moment to FIGS. 1A and 1B, the case of a sensor S, which has a certain fault-tolerance requirement.

For some replicate f of some function, such a replicate may have to consume a data from sensors S1, S2 and S3 which are replicates of sensor S. Suppose that these sensors provide information through respectively dataflow D1, D2 and D3. For the sake of simplicity and by way of non-limiting example, let us consider that S1, S2 and S3 measure a brake pedal position.

Let us also consider, as a first approximation, that the signal is binary. If the signal is high, it means the driver is braking; when the signal is low, the driver is not braking. A filtering is performed on the input and the value is computed from five samples performed every 500 micro seconds. Note that filtering is a kind of redundancy as it means we use few samples to build a value. This means that when the pedal switch is low, 1.5 ms are necessary before the switch detection is really transmitted in the absence of fault.

Now we must take into account the propagation delay of D1, D2 and D3 in the architecture. We assume that the capture of sensors S1, S2 and S3 are performed on three different microcontrollers with different clocks; clock1, clock2, and clock3. So dataflow D1, D2 and D3 in fact go through a complex electronic architecture made of electronic control units (ECU's) and communication busses. Let's consider that D1 propagation requires 5 ms +/−3 ms; D2, 8 ms +/−4 ms and D3 10 ms +/−2 ms, including various clock drifts and various jitters. Let's also consider:

D1 is sent every 5 ms=clock1*N1 cycles, D2 every 5 ms=clock2*N2 and D3 every 5 ms=clock3*N3;

clock1, clock2 ad clock3 have variations of less that 3% under normal functioning; and the task calculating "f" is executed within 1 ms and scheduled every 5 ms.

Suppose we compare the last 3 samples of D1, D2 and D3 received by f, let's call them D1f, D2f and D3f. The question is then: when will we converge on a pedal braking request identification after an actual pedal braking request by the driver?

$D1f$ represents a signal whose age is in the range $R1$[−15.545 ms ... −11.5 ms]1.5 ms+5 ms+(0.003*5 ms)+1 ms+5 ms+3 ms=15.515 ms $D2f$ represents a signal whose age is in the range $R2$[−19.545 ms ... −14.5 ms]1.5 ms+5 ms+(0.003*5 ms)+1 ms+8 ms+4 ms=19.515 ms $D3f$ represents a signal whose age is in the range $R3$[−19.545 ms ... −16.5 ms]1.5 ms+5 ms+(0.003*5 ms)+1 ms+10 ms+2 ms=19.515 ms The fact that range R1 and R3 have no intersection is not a problem as long as the frequency of the phenomenon we observe is an order of magnitude larger than the sampling. If the signal we are looking for is evolving at a frequency below or of the order of 20 ms, then our sampling is non sense. In case of a human action, the rate is rather in the range of hundreds of milliseconds and, in the case of a brake pedal usually certainly over 100 ms for a slight braking, the pedal being pushed during at least one second.

Figure 1B:
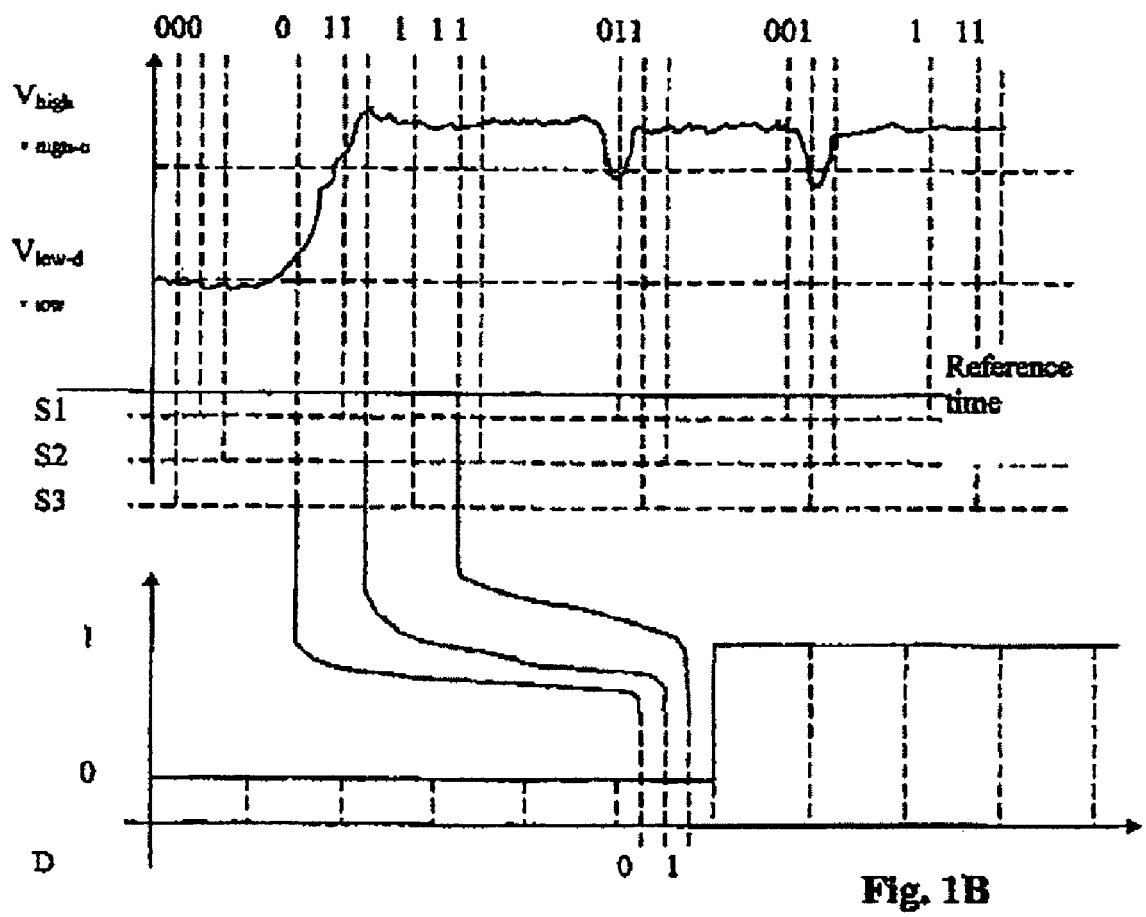

Turning now to FIG. 1B, it can be seen how sampling and communications are performed in "real" time. Taking into account the fact that the value of D1, D2 and D3 is received at most 20 ms after the actual values are captured, then any computation of vote between D1 D2 and D3 will yield the switch to one except if the number of failures is superior to 1. The same is true if the brake pedal is released.

If we take into account the fact that "f" is scheduled every 5 ms (with at most 1 ms delay due to its worst case execution time, then "f" will yield an accurate brake command "O" at most 26 ms after a brake request has been detected. The same is true for a brake release.

Suppose now that we are not dealing with a Boolean signal but rather with an integer value representing the pedal brake request. The following algorithm may then be used: consider the 3 latest values of D1, D2, D3 are received by "f" and exclude the two extreme values (we consider only one fault). We may take care that the different values that we compare were not captured exactly at the same moment, e.g. the difference of age may be nearly 10 ms. If we consider that the pedal brake movement during 10 ms is in the range of accepted precision, knowing the precision of each sensor, then this algorithm is sound.

It is also possible to filter the value by averaging it with the three previous values to give some "inertia" in the command if this is acceptable in the context of a strong braking. The detail implementation of such filtering, however, is a matter of the ergonomics of the pedal and out of the scope of our present exposition.

In a real design, other filters may be introduced that would still increase the response time in our example. In the case of a braking system, if we consider that the output "O" is a command of the brakes that may be performed within 24 ms by the electromechanical components, it means that braking will start at most 50 ms after an actual request with a precision that may be specified in terms of percentage of the pedal braking request measure.

Our partial brake system is somehow "synchronous": our global time is the driver pace of action. What we have shown here is that a distributed system doesn't need to be time-triggered to provide dead-line insurance. Also, time errors don't need to be considered differently from value precision errors and can be turned into a precision range as long as the aging of propagated information can be bounded with a given precision. The fact that a signal is late can then be considered as an error. For instance there is a classical default known in the art data buses as the "babbling idiot" default, in which a node of a bus is constantly transmitting in an unregulated fashion. This wastes access and traffic time and usually delay messages on the bus.

The input to our approach according to the present invention is a functional design together with functional modes and a functional safety analysis. This is obtained by performing the following steps:
a) identifying a set of undesirable events and ascribing to each of those undesirable events an indicator of their severity;
b) associating where possible each of those undesirable events with one or more actuators of the system architecture proposed by the functional design;
c) developing a functional specification of an initial architecture proposed for implementation of that system architecture, the functional specification of the initial architecture including dataflow for and between components thereof, those components comprising for example sensors or actuators; and
d) refining on said functional specification the fault tolerance requirements associated with the severity of each said undesirable event and issuing refined fault tolerance requirements of said functional specification.

During implementation of the design method, replicates are produced in of the functional specification together with attached indicators of independence of those replicates, the indicators reflecting the refined fault tolerance requirements. The design process also defines a hardware structure for the proposed system architecture, e.g. a series of electronic control units connected to each other by networks and then maps the functional specification onto that hardware structure.

The process includes verifying automatically that those indicators of independence are preserved during mapping. Thus, the design process has by way of an output a proof that the proposed system architecture does or does not meet some previously defined safety requirement. If this proof shows that the system satisfies the specified safety requirements, it can then be used as an input to a validation model for testing.

A further output of the design process may be a set of local requirements applying to each component of the architecture that must be proved when eventually building the system. This may be in the form of data for use as inputs further downstream and may ultimately translate into a set of instructions suitable for use in co-operation with a machine producing components or circuit layouts for use in that system architecture.

Among the advantages of the present invention is the abstraction of safety concepts, which allows a divide and conquer approach. This is the key for complex systems design. Furthermore, we do not rely on a particular technology, bus protocol or any predefined safety design framework. On the contrary, framework like TTP can be seen as "parameter" in our approach, which means we can even produce a fault-tolerant system with no such fault-tolerant technology around. Said otherwise, the method we have invented and disclosed allows the consideration and comparison of existing frameworks, but it also provides means to combine them. This former point is especially interesting because, as mentioned earlier, combining different technologies is the best way to avoid design errors.

Figure 2:
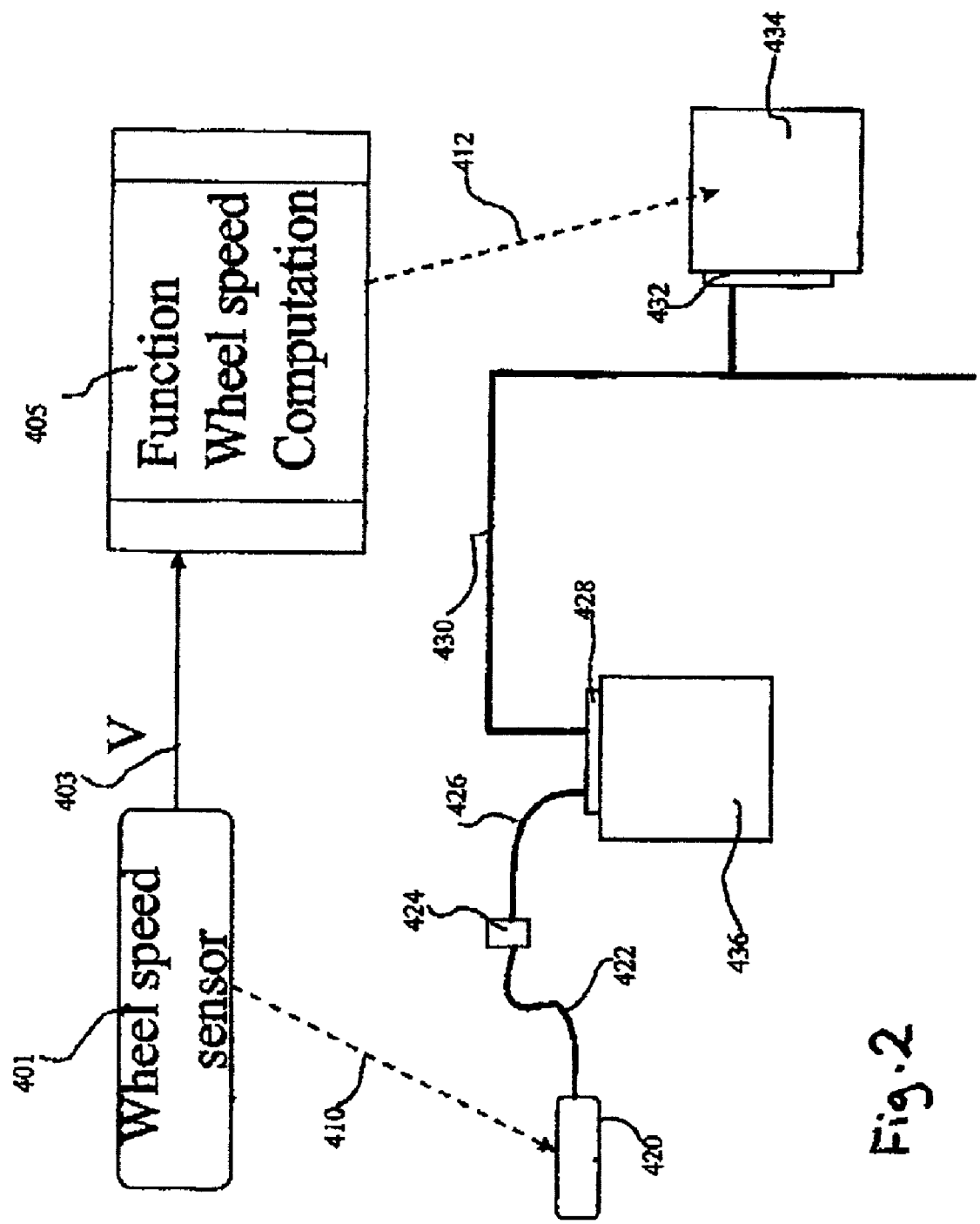
FIG. 2 describes the mapping of a functional architecture onto a hardware architecture in accordance with a stage in the method of the present invention.

We now consider a specific but non-limiting example relating to vehicle braking with reference to vehicle speed detection in FIG. 2 and its treatment in abstraction using the methodology illustrated in FIGS. 3A to 5. All the time, an overview of the design process can be kept with particular reference to FIG. 6.

In FIG. 2, the function "wheel speed computation" 405 has dataflow "V" 403 as input from wheel speed sensor 401. In the implementation proposed, the same wheel speed sensor 420 is attached to an ECU 436 and the function "wheel speed computation" 405 is performed on ECU 434.

Wheel speed sensor 401 from the functional architecture is translated (arrow 410) into wheel speed sensor 420 from the hardware architecture. Function "wheel speed computation" 405 from the functional architecture is translated (arrow 412) into an executable process on ECU 434. Dataflow between wheel sensor 401 and function "wheel speed computation" is translated into a complex path involving:
ECUs 436 and 434 and their respective connectors, 428 and 432;
network 430;
links 422 and 426; and
connector 424.

In FIG. 3A, function "F" 603 has at least one input dataflow "i" 601 and one output dataflow "o" 605. Other inputs and outputs are not drawn for the sake of simplicity.

"F" and its input and output can be tagged with fault-tolerance attributes: 611, 613 and 615. Tag "FT(F)" (613) means that there exist a fault-tolerance requirement on function "F". This means intuitively that the implementation of "F" will require replicates on different ECUs so that, given a set of input, a majority of "F" processing will succeed even in the occurrence of one fault. "FT(o)" (615) means that there exists a fault tolerance requirement on dataflow "o". "FS(i)" (611) means that there exists a fail-silent requirement on dataflow "i".

According to the process described in the invention, tag FT(o) is inferred from (a consequence of) a safety requirement on a function that consumes dataflow "o". In FIG. 3B, the system designer has deduced from the safety requirement on "o" that "F" shall be fault tolerant and that dataflow "i" shall be fail-silent.

In a further step of the process of the present invention, we can see in FIG. 3C that objects 621 to 655 that safety requirements on function F, dataflow "I" and "o" are replicated to cope with the safety requirements specified by tags 611, 613 and 615. In FIG. 3C, the replicates are defined for one symmetric fault. This means only three replicates are required for a fault-tolerant component and two replicates for a fail-silent component.

In FIG. 3C, F1 641, F2 643 and F3 645 are replicates of function "F", dataflows $FT(o)_1$ 651, $FT(o)_2$ 653, $FT(o)_3$ 655 are replicates of dataflow "o", dataflows $FS(i)_1$ 621, 625, 629 and $FS(i)_2$ 623, 627, 631 are replicates of dataflow "i".

In FIG. 3C, dataflow $FT(o)_1$ is processed from $F_2$ and $F_3$ results, respectively "$o_2$" (624) and "$o_3$" (626) on one hand, and from the processing "$o_1$" of input $FS(i)_1$ and $FS(i)_2$ by $F_1$ on the other hand. For this processing to be performed, a vote procedure may be applied between $FS(i)_1$ and $FS(i)_2$ and between computations of "$o_1$" respectively "$o_2$" (624) and "$o_3$" (626). Under a more general embodiment, $FT(o)_1$ may be simply the triplet composed of "$o_1$" processed by $F_1$, "$o_2$" (624), "$o_3$" (626). In that case, the vote may be performed by any function that will consume $FT(o)_1$.

Note that "$o_3$" (626) is different from "$o_3$" (632) as these dataflow may fail differently once implemented because they may not follow the same physical path. So we make the distinction between, "$o_3$" processed by $F_3$, "$o_3$" (626) received by $F_1$ and "$o_3$" (632) received by $F_2$.

When processing $F_1$, "$o_2$" (624) and "$o_3$" (626) need to be computed sufficiently recently and there should exist a justification that computations of "$o_1$", "$o_2$" (624) and "$o_3$" (626) before a vote are performed in a timely manner as described in our brake pedal request example above. Their sampling and aging should be sound with respect to ("w.r.t.") the expected precision on dataflow "o". Such a justification is simpler in the context of a time-triggered system, which is the reason why time-triggered systems are used most of the time when the cost of electronic components is not an issue (for small series for instance).

Two replicates of a fail-silent object are said to be free for one symmetric fault if a single symmetric fault cannot raise an error on both replicates at a time. As a counter example, function "G" in FIG. 3D shows the case where dataflow x1 673 and x2 675 are linked because a fault in the processing of function "G" raises potentially an error on x1 and x2.

Three replicates of a fault-tolerant object are said to be "free" for one symmetric fault if a single symmetric fault cannot raise an error on more that one of the replicates at a time.

For "k" an integer, "2k+1" replicates of a fault-tolerant object are said "free" for "k" symmetric faults if "k" symmetric faults cannot raise at least an error on more that "k" replicates at a time. These definitions can be extended for a fail-silent component and for asymmetric faults (e.g. "3k+1").

These definitions apply for processes exactly like for dataflow, an error of a process is a wrong execution while an error of a flow is a wrong transmission of information or no transmission at all. The fact that an error can be detected or not is something the designers know when tagging the dataflow.

Associated with the creation of replicates for F and for other objects, "freeness" requirements between the replicates of any object are generated. This is performed preferably automatically, but ultimately will depend on the choice of strategy for replication and voting.

In FIG. 3C, dataflow $FT(o)_1$ 651, $FT(o)_2$ 653 and $FT(o)_3$ 655 shall be free, which means a single failure cannot raise an error on more than one of these flows at a time. Similarly, $FS(i)_1$ and $FS(i)_2$ shall be free, $F_1$, $F_2$, $F_3$ shall be free, which means that a single fault cannot raise a fault in the processing of more that one of the replicates at a time, "$o_1$" dataflow sent to $F_2$ (622) and to $F_3$ (628) shall be free, the same requirement is from "$o_2$" and "$o_3$" instances produced respectively by $F_2$ and $F_3$, (624) and (630) on one hand and (632) and (626) on the other hand shall be free.

Other replication schemes can be implemented and their attached freeness requirements may then differ. For instance, for a system which should tolerate an asymmetric fault, four replicates will be necessary for F while only three are actually necessary in our FIG. 3A to 3D example if only one symmetric fault is to be tolerated.

Freeness is a local property as long as replicates are copies of the same source. If a fault-tolerant input is based on a vote between three functional replicates of a dataflow, say "d, e, f" which are different means of computation of the same result proposed by the designer, then "d, e, f" must be free to guarantee that one fault cannot impact two of them, but then the freeness property is not local. Saying that three independent dataflows provided by the designer are "free" means that there is no object which participates at any stage in the computation of two of them. This property is a lot more difficult to prove because it may involve the whole functional architecture. It may be proved in the functional architecture before tagging and replicates and thus forms an initial part of the design process embodied in the method of the present invention. Also, the freeness requirements issued from analysis of the functional replicates will have to be met once the functional architecture will be mapped on a hardware architecture.

When we map a functional architecture made of items 621 to 655 onto a physical architecture, the freeness requirements shall be satisfied after the implementation. It means that the components mapped on the hardware architecture shall satisfy the same freeness requirements as the components before mapping. In FIGS. 4A to 4D, we illustrate the mapping of a fail-silent function on a hardware architecture. We start with the same process steps as in FIGS. 3A to 3D.

In a first step (FIG. 4A), items 701 to 705, function "J" 703 is specified with its input dataflow "k" 701 and an output dataflow "i" 705.

In a second step (FIG. 4B), items 711 to 715, after a backward analysis from actuators to sensors, function J and its input and output flow are tagged with safety attributes, (713) for J, (711) for "k" and (715) for "i". "FS(J)" 713 means that J must be fail-silent so that in case a fault occurs, FS(J) either send the result of a fault-free processing of J or nothing.

In a third step (FIG. 4C), items 721 to 735, replicates and freeness requirements are specified to provide the required safety level. For instance $i_1$ and $i_2$ shall be free and functions $J_1$ and $J_2$ should be free.

In a fourth step (FIG. 4D), the redundant functional architecture is mapped onto a hardware architecture consisting of ECUs and networks. Function $J_1$ is processed on ECU 741 and function $J_2$ is processed on ECU 743. We can check that $J_1$ and $J_2$ are free in this implementation. But if dataflow "$i_1$" and "$i_2$" are mapped on communication bus 745 by the designer, the freeness condition of "$i_1$" and "$i_2$" is not satisfied anymore because one fault (the bus is off) will infer an error for both "$i_1$" and "$i_2$". So, it is sounder to have "$i_1$" send on bus 745 and "$i_2$" sent on bus 747 to meet obviously the freeness condition.

Note that, during the mapping of the redundant functional architecture onto a hardware architecture, we proceed to a refinement of the safety freeness requirements. For instance, the requirement that "$i_1$" and "$i_2$" are free turns into a requirement that the implementation of these flow are free which is a more complex condition.

If we now consider the probability of components to fail, the design of a fault tolerant system is more accurate. Freeness conditions are now specified in terms of probabilities.

Let "p" be the largest acceptable probability for a fault to raise a fault of both dataflow "$i_1$" and "$i_2$" in a period of time. Probability "p" somehow represents freeness degree of "$i_1$" and "$i_2$". It is also the probability where it is acceptable that the system (and function J in particular) be not fail-silent in the occurrence of a fault.

So if flow "$i_1$" and "$i_2$" are sent on a bus that failure probability is less than "p", the freeness condition is satisfied. If, on the contrary, assuming "p1" is the failure probability of bus 745 and "p2" the failure probability of bus 747, then if p1*p2 is superior to "p", then even if "$i_1$" is send on bus 745 and "$i_2$" on bus 747, the freeness requirement is not met and a more reliable design is requested.

Figure 5:
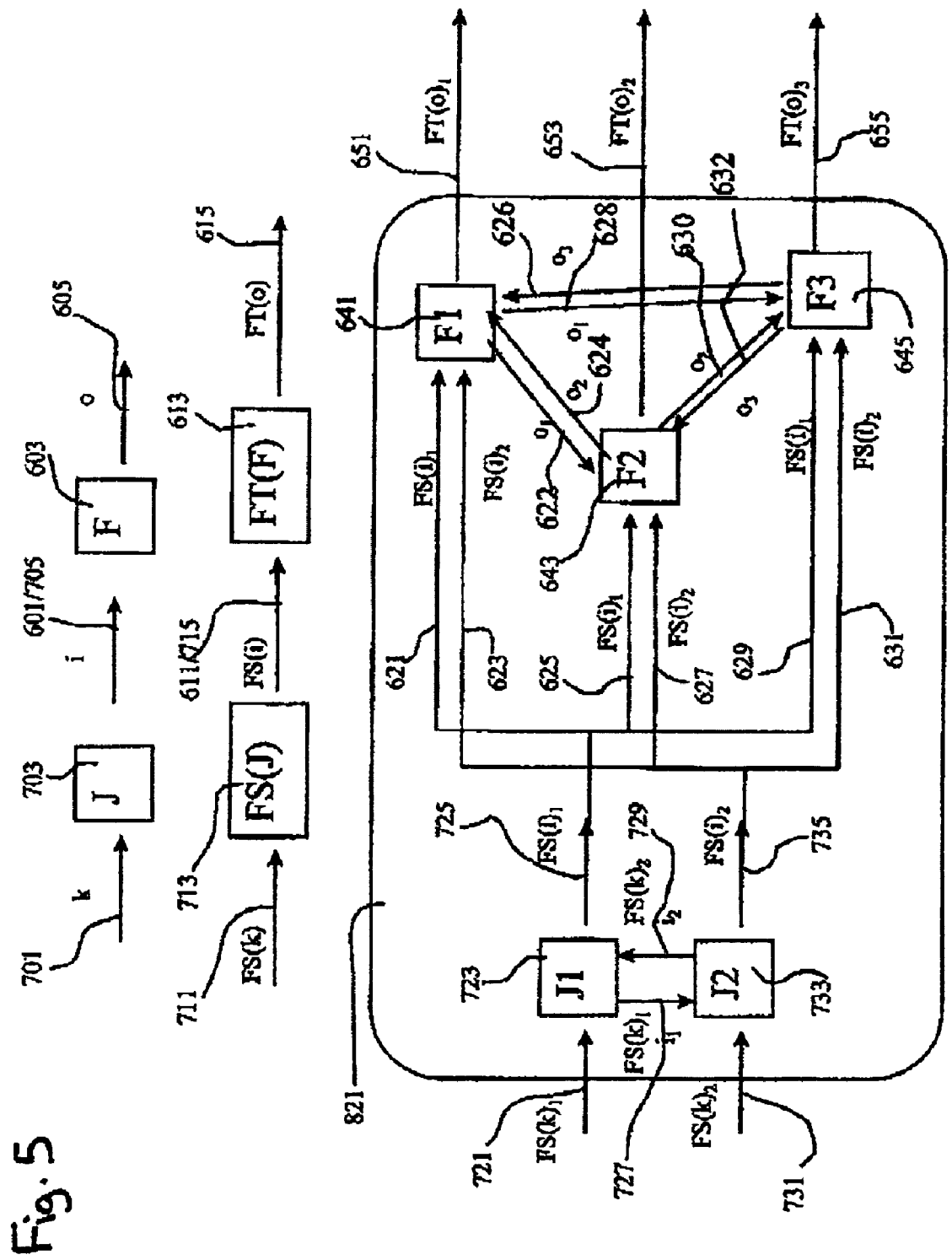
FIG. 5 illustrates the stability of fault-tolerant requirements through functional composition in accordance with the method of the present invention.

In FIG. 5, we illustrate how tagging and safety requirements are stable when combining functions. This aspect is very important because it is the key for our "divide and conquer" approach, in which all safety requirements to be proven on system will reduce to a proof that a set of processes or of a set of dataflow are free. In this manner, the effort to make the proof increases linearly with the number of functions and dataflow and not exponentially.

This means that, if we have a safety requirement on the composition of F and G (FoG), then this is the result of safety requirements of the flow between F and G on one hand, and safety requirements of F and G with other functions on the other hand. Eventually, proving that the system is fault-tolerant will turn out to be a number of simple proofs at the functional level. Proving that a complex system satisfies some safety requirements is equivalent to proving that each function in the system meets "local" safety requirements refined from the requirements at the system level. For example, proving that 100 sets of replicates of functions and/or dataflow mapped on five ECUs are free, may consist in proving individually that each set of replicates is free. This compositional property of safety requirements is the key for a "divide and conquer" approach, which as a result is scalable.

Examples from FIGS. 3A to 3D and 4A to 4D have been appended in FIG. 5. to show how the analysis in FIGS. 3A to 3D and 4A to 4D are combined when the functions are combined. This gives the flavor of how things are dealt with for a complex system involving several functions.

During composition of functions J and F, dataflow 601 and 705 are equalized because they represent the same dataflow "i". If several functions consume dataflow "i", the safety requirements on "i" is the maximum of the safety requirements inherited from each function consuming "i". So the number of replicates and their reliability is also computed the same way.

Conversely, if three replicates of a data are available, e.g. because a fault-tolerance requirement is specified, this data is consumed by a function having no safety requirement. It is then sufficient to pick up one of the replicates output in order to compute that function. On the other hand, if three replicates exist, it is because at least one fault-tolerant function replicate will consume all three dataflow replicates.

Outline 821 in FIG. 5 illustrates the composition of functions F and J described in FIGS. 3A-D and 4A-D. Note that, as for the "i" dataflow, dataflow 725 and one hand and dataflow 621, 625 and 629 on the other hand are equalized. Similarly, dataflow 735 on one hand and 623, 627, and 631 on the other hand are equalized.

If we consider FoJ, the composition of F and J, then meeting freeness requirements for FoJ means meeting freeness requirements between F and J inside outline 821 on one hand and for F and for J separately outside 821.

So a functional architecture can be recursively tagged completely, starting from the actuators and iteratively up to the sensors. Then, functional replicates together with the freeness requirements can be generated. Note that the generation can be performed automatically if the replication strategy is standard for each level of fault-tolerance. For instance, every fail-silent function in the presence of at most one fault will be replicated the same way as J in FIG. 4.

Once mapping of the redundant functional architecture (after the replicates production phase) on a hardware architecture is performed, an optimization consists in choosing for any function the dataflow replicates which implementation is the less expensive. For instance, if a function F consumes a dataflow "i" with three replicates, i1, i2 and i3. Suppose F does not require any fault-tolerance property from input "i". Then, one of the "i" replicates needs to be consumed. If for instance i1 is available on the ECU which processes F and i2 is available on another ECU, then it is worth choosing i1 as an input for F.

Figure 6:
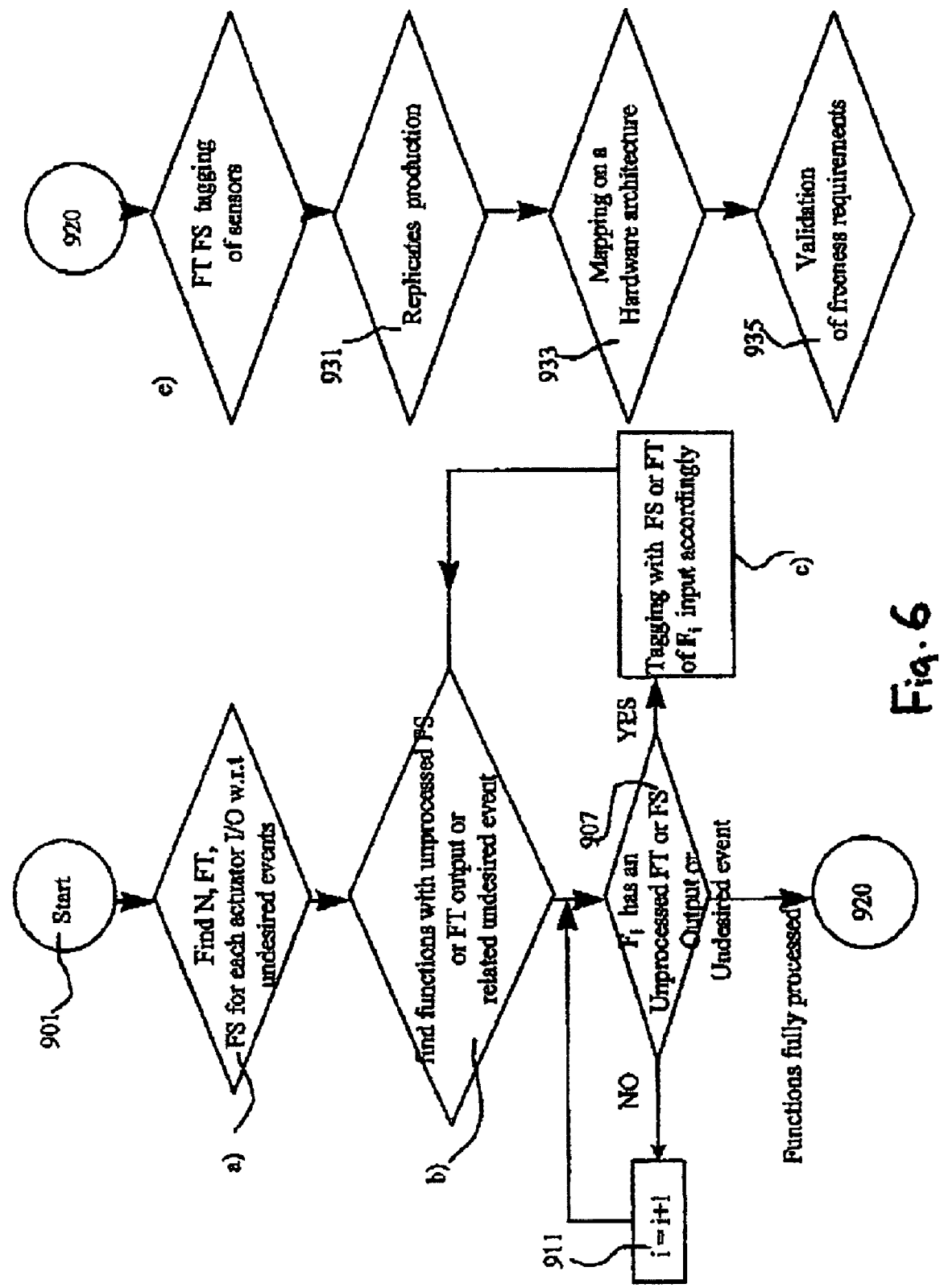
FIG. 6 illustrates the overall process, according to the present invention, of design and verification of a fault-tolerant electronic architecture.

In FIG. 6, a preferred embodiment of the design process of a fault-tolerant architecture is described in accordance with the present invention. The process includes the following steps:
1 Identification of undesirable events and their gravity.
2 Functional specification of the system built with its real or virtual sensors and actuators.
3 Description of limp-home modes.
4 Association of undesirable events with real or virtual actuators.
5 Refinement of undesirable events on the functional architecture.
6 Redundancy introduction together with safety requirements refinement.
7 Hardware architecture definition.
8 Mapping of functions on electronic control units.
9 Verification of the fault tolerance of the resulting electronic architecture.
10 Geometrical mapping of physical components and wiring.
11 Verification of the fault tolerance of the resulting electrical-electronic architecture.

This process is not intended to be linear. A few loops are hidden in the presentation. For instance, step 6 may be implemented through different ways which may occasion many reworks. Also, different hardware architectures may be investigated in step 7, as the goal is to find the less expensive architecture under given fault tolerant requirements. In step 8, different mapping will be investigated, especially if step 9 proves that a mapping is not satisfactory and requires some more work. Also, in step 10, different location of nodes may be investigated. The new process steps illustrated in FIG. 6 will now be described in greater detail, some aspects of classical techniques not being described in full detail herein.

1. Identification of Undesirable Events and their Gravity

This step is the well known step of Functional Failure Analysis (FFA) which is a classical part of safety analysis. The result of FFA for a system is the identification of undesirable events together with the severity of the consequences when the said events occur.

2. Functional Specification of the System Built with its Real or Virtual Sensors and Actuators This step may be performed using for example the technique described above in relation to FIG. 2.

At this stage, we can refine the definition of design fault which was already mentioned earlier. A design fault is a fault made in the functional specification.

3. Description of Limp-Home Modes:

Description of modes is complementary to the functional architecture. A system can be described as composed of a control-automata, e.g. Statechart, that triggers a dataflow [Fuchs98]. At the highest level, the automata should implement system modes: initialization, nominal mode, limp-home modes and the behavior to switch from a mode to another.

For instance, in the case of a car braking system, if the front left brake is not functioning and the other brakes work properly, braking will result in a loss of stability of the vehicle which is worse than no braking at all in many cases. So, in that case, a reliable limp-home mode will consist in braking with front right and rear left brakes with adapted braking pressure for each: in that case, the vehicle speed will decrease subsequently and the vehicle will remain stable.

In a safety-critical system, limp-home modes will mostly consist in providing a degraded service in case the nominal mode is not available due to some fault. This is the step where we start in FIG. 6.

4. Association of Undesirable Events with Real or Virtual Actuators and State Transitions (step a) in FIG. 6):

In our process we consider only a subset of the FFA result, for each undesirable event, we consider the involved actuators, the actuators of which failure will raise the undesirable event, all other actuators functioning normally. For instance, for a vehicle braking system, we can consider the undesirable event "lack of stability during braking". This may be possible if one of the actuators is not braking while the three others are. If our target is that the system be tolerant to one fault, an analysis may lead for instance to the conclusion that the lack of stability is due to a failure of one of the actuators. In that case, we would associate "lack of stability during braking" to each of the brake actuators alone. If now we consider the undesirable event "no braking while braking requested", then it is clear that none of the actuator received a sound command so that this undesirable event is obviously associated with the set of all brakes.

But suppose that our braking system is triggered by a control-automata and that the braking request is a transition of the automata which leads to state "brake". If the transition is not executed properly, the undesirable event will occur even if each brake is working properly. So an undesirable event may be attached to a state transition if the said state transition failure may raise the said undesirable event. At the end of this step each undesirable event is attached to one or few subsets of all actuators or state transitions results, together with a severity.

A possible reference for the severity levels is provided in norm [IEC61508]. Depending on the severity, fail-silent or fault-tolerance levels in the presence of one or two faults are expected together with expected probabilities of failure acceptance.

In the case of an electrical braking system, the actuators are requested to be "fail-silent", i.e., it should be proved that a brake can be put in a physical state where it does not function. If a probability is expected, we will say that, the electrical brake can be put in a physical state where it does function except with a probability "p" per unit of time, "p" being very low for instance $10^{-8}$ per hour.

5. Refinement of Undesirable Events on the Functional Architecture:

Given at the beginning of 901 a functional architecture made of sensors, actuators and functions and a dataflow, some dataflow modeling an electrical current, a battery being modeled as a sensor and having identified in previous step (a) undesirable events and linked actuators; the design engineer can then indicate whether he expects fail-silent or fault-tolerant or no requirement from the different input flow of each actuator depending on the undesirable events associated with said actuator in isolation.

For instance in the case of a brake system, as a requirement exists that a brake alone should not fail, the braking force command of each brake can be specified fault-tolerant. But the designer may simply consider that a fail-silent requirement is sufficient if the brake system can react sufficiently quickly after a failure is detected. This tagging is depending on the functional architecture and its properties, which is an input in our method.

Iteratively, we then determine the safety requirements of functions and sensors by applying the same analysis to each function and each relevant undesirable event for said function.

If a function produces a dataflow which, through the functional architecture, is contributing directly to the control of a set of actuators, then we should consider for that function all the undesired events which are linked to a subset of said set of actuators to establish the safety requirements on said function and on the input of said function. Moreover, we have to consider also for that function each constraint on its output is coming from a previous safety analysis on a function consuming that output. In FIG. 5, for instance, the requirement 615 on the output of function F implies requirement 611 on the input of function F. This turns out to be also the output of function J so that previous analysis on function F implies requirement 711 on input of function J and a constraint on J itself.

In step (b), we compute the set of functions for which requirement on the output or related undesirable events are not yet processed.

In step (c), for each function computed in (b), we analyze:
i) which new safety requirements on input are required; and
ii) what level of safety is required for the function itself (Fault-tolerance "FT", Silence in the presence of a fault "FS", Nothing "N"), We then follow steps 907 and 911 and iteratively apply (b) and (c) as long as the set determined at step (b) is not empty.

In step (e), each sensor takes the maximum level of fault tolerance required for the dataflow it produces.

Also, the refinement of safety requirements on the dataflow is to be performed in each mode because each mode of operation has to be considered separately. Undesirable events should be applied on mode transitions by considering, for each undesirable event, which faulty mode transitions could be involved. Note that mode transitions are a particular case of state transition. In case a requirement is set on a transition, we proceed exactly like in the case of an actuator.

It is required that a mode transition does not fail under the undesirable event that leads to its activation. So, for each undesirable event that raises a mode transition, the mode transition should inherit the safety requirements corresponding to the undesirable event severity and should be associated with that undesirable event.

6. Redundancy Introduction Together with Safety Requirements Refinement (931 in FIG. 6):

Then, in step 931, for each function, an implementation mode of the function selected to implement the replicates and voting mechanism is required, depending on the safety requirements generated so far. At this step we also collect the freeness conditions as described in FIGS. 3A-D, 4A-D and 5.

The resulting functional architecture is larger than the initial one. Note that if no Fault-tolerance or Fail-silent requirement is specified, the functional architecture is unchanged at this step.

7. Hardware Architecture Definition

At this step, we specify the electronics control units (ECU's) and networks that will implement the system. In a context where the safety analysis is quantitative, expected failure rates per unit of time for each hardware component are specified.

8. Mapping of Functions on Electronic Control Units (933):

At this step, the functions are mapped on electronic control units, as illustrated in FIG. 4 for instance.

9. Verification of the Fault Tolerance of the Resulting Electronic Architecture (935):

This step consists in the verification of the freeness conditions. This verification can be performed automatically. For example, the dataflow linked by freeness conditions may be recorded in a database accessible to a computer being programmed as a design tool. The components implementing a dataflow may also be recorded in such a database in similar fashion. We then find automatically using that design tool whether a component implementing several free dataflow exists or not.

The software for implementing the process of the present invention may usefully be recorded in a computer program product, such as a computer readable memory, in the form of a program suitable for execution by a computer adapted thereby to operate as that design tool. The computer program product may comprise a computer readable medium having encoded on it a computer program code in such a form that, when the program is loaded, it makes the computer execute procedure to design and verify a system architecture in accordance with the method of the present invention.

The output of the request can be the list of such components and that output may be in a form suitable for manual or automatic checking of the physical design robustness of a proposed architecture. In case probabilities are specified, the output of the request can be the list of such components with reliability below the expected failure probability of freeness conditions.

10. Geometrical Mapping of Physical Components and Wiring (933 bis):

At this step the wire paths, connectors and cables between electronic control units, batteries, sensors, actuators and more generally electrical components is specified.

11. Verification of the Fault Tolerance of the Resulting Electrical-Electronic Architecture (935 bis)

The freeness properties are refined through the geometrical mapping of components: if two wires W1 and W2 carry respectively dataflow D1 and D2 and if D1 and D2 are free then, it is not possible to connect wires W1 and W2 to the same connector C. If C is faulty, then both W1 and W2 may be disconnected due to the same fault which is unsound with respect to the freeness requirement.

So the verifications which are to be made after the geometrical mapping concern connectors and cables (which gather wires together) and freeness conditions are then refined into:
- disallow connecting wires carrying free flow to the same connector except if probabilities are specified and if the probability for the connector to be faulty is below the required freeness default probability.
- disallow gathering together wires carrying free dataflow in the same cable, except if the cable production process prevents with sufficiently low probability the occurrence of short-cuts, open circuits, i.e. below the default freeness probability of the said dataflow.

Freeness conditions on wired dataflow will produce new requirements (impossibility requirements). Verification of this can be performed automatically. For example, the dataflow linked by freeness conditions may be recorded in a database accessible to a computer being programmed as a design tool. The components implementing a dataflow may also be recorded in such a database in similar fashion. We then find automatically using that design tool whether a component implementing several free dataflow exists or not. The software for implementing the process of the present invention may usefully be recorded in a computer readable memory in the form of a computer program for execution by a computer adapted thereby to operate as that design tool.

It can thus be seen that the present invention provides a design process having method steps for a scalable design of safety critical systems. Furthermore, analysis can be performed at the functional level and then used on different hardware implementations, e.g. for the purpose of assessing whether a proposed hardware implementation is the less expensive and/or safer than another.

References

[Fuchs98] "Advanced Design and Validation Techniques for Electronic Control Units", Max Fuchs et al, SAE, 1998 SAE paper 980199 available online: www4.informatik.tu-muenchen.de/publ/papers/FEMPS98.pdf

[Harel87] "State charts: A Visual Formalism For Complex Systems", David Harel, Science of Computer Programming 8, Elsevier Science Publisher B. V (North Holland), 1987

[Rush95] "Formal Methods and Their Role in the Certification of Critical Systems", John Rushby, Technical report CSL-95-1, *Computer Science Laboratory*, SRI International, Menlo Park, Calif., 1995

[Kop96] "The Systematic Design of Embedded Real-Time Systems", H. Kopetz, Lecture notes, Hermann Kopetz, 1996; also in "Real-Time Systems: Design Principles for Distributed Embedded Applications", H. Kopetz, published by Kluwer Academic, 1997

[IEC61508] "IEC 61508: Functional safety of electrical/electronic/programmable electronic safety-related systems", *International Electrotechnical Commission* (IEC),1998.

[SCHEID02] "Systems Engineering for Time Triggered Architectures" (SETTA). Deliverable D7.3, Final Document, version 1.0", XP-002264808, 18 Apr. 2002. This can be found via the URL: "http://www.setta.org"

The invention claimed is:

1. A method of producing a system architecture with a design tool computer, the system architecture including a plurality of electrical components connected to each other, the components including electronic control units, sensors and actuators, the method comprising:
   a) identifying a set of undesirable events and ascribing to each of the undesirable events an indicator of severity;
   b) associating each of the undesirable events with any involved actuator of the actuators of the system architecture;
   c) developing a functional specification of an initial architecture proposed for implementation of the system architecture, the functional specification of the initial architecture including dataflow for and between electrical components thereof;
   d) refining on the functional specification fault tolerance requirements associated with the severity of each of the undesirable events and issuing refined fault tolerance requirements of the functional specification;
   e) producing replicates in the functional specification together with attached indicators of freeness of the replicates from other of the replicates, the indicators reflecting the refined fault tolerance requirements;
   f) defining a hardware structure for the system architecture;
   g) mapping, via the design tool computer, the functional specification onto the hardware structure; and
   h) verifying automatically that the indicators of freeness are preserved during the mapping.

2. A method according to claim 1, wherein the system includes a fault tolerant system.

3. A method according to claim 1, wherein the developing (c) includes defining a series of modes of operation.

4. A method according to claim 3, wherein the modes of operation include nominal and limp-home modes.

5. A method according to claim 3, wherein the defining a series of modes of operation includes specifying the series of modes in a form of one or more state charts.

6. A method according to claim 1, further including mapping geometrically hardware components and/or wiring and then verifying automatically that the indicators of freeness are preserved by the geometrical mapping.

7. A method according to claim 1, further including specifying the severity in a form of probability of failure per unit of time.

8. A method according to claim 1, further including outputting a set of data for use in manufacturing the system architecture.

9. A method according to claim 1, wherein the system architecture includes a safety critical architecture for a vehicle.

10. A method according to claim 1, wherein the hardware structure is in a form of a series of electronic control units connected to each other by networks.

11. A method according to claim 1, wherein the verifying automatically that the indicators of freeness are preserved during the mapping includes verifying that a first wire which carries a first data flow and a second wire which carries a second data flow, the first data flow and the second data flow being free, are not connected to a same connector.

12. A computer readable storage medium having thereon computer executable instructions that, when executed by a computer, make the computer execute a method to design and verify a system architecture, the method comprising:
   a) identifying a set of undesirable events and ascribing to each of the undesirable events an indicator of severity;
   b) associating each of the undesirable events with any involved actuator of the actuators of the system architecture;
   c) developing a functional specification of an initial architecture proposed for implementation of the system architecture, the functional specification of the initial architecture including dataflow for and between components thereof;
   d) refining on the functional specification fault tolerance requirements associated with the severity of each of the undesirable events and issuing refined fault tolerance requirements of the functional specification;
   e) producing replicates in the functional specification together with attached indicators of freeness of the replicates from other of the replicates, the indicators reflecting the refined fault tolerance requirements;
   f) defining a hardware structure for the system architecture;
   g) mapping the functional specification onto the hardware structure; and
   h) verifying automatically that the indicators of freeness are preserved during the mapping.

13. A computer readable storage medium according to claim 12, wherein the hardware structure is in a form of a series of electronic control units connected to each other by networks.

14. A computer readable storage medium according to claim 12, wherein the components include sensors or actuators.

15. A computer readable storage medium according to claim 12, wherein the verifying automatically that the indicators of freeness are preserved during the mapping includes verifying that a first wire which carries a first data flow and a second wire which carries a second data flow, the first data flow and the second data flow being free, are not connected to a same connector.

16. A design tool, comprising:
   a computer configured for design and verification of a system architecture, the system architecture including a plurality of electrical components connected to each other, the components including electronic control units, sensors, and actuators, the design tool configured to:
   a) identify a set of undesirable events and ascribe to each of the undesirable events an indicator of severity;
   b) associate each of the undesirable events with any involved actuator of the actuators of the system architecture;
   c) develop a functional specification of an initial architecture proposed for implementation of the system architecture, the functional specification of the initial architecture including dataflow for and between components thereof;
   d) refine on the functional specification fault tolerance requirements associated with the severity of each of the undesirable events and issue refined fault tolerance requirements of the functional specification;
   e) produce replicates in the functional specification together with attached indicators of freeness of the replicates from other of the replicates, the indicators reflecting the refined fault tolerance requirements;

f) define a hardware structure for the system architecture;

g) map the functional specification onto the hardware structure; and h) verify automatically that the indicators of freeness are preserved during the mapping.

17. A design tool according to claim 16, wherein the system includes a fault tolerant system.

18. A design tool according to claim 16, wherein the components include sensors or actuators.

19. A design tool according to claim 16, wherein the hardware structure is in a form of a series of electronic control units connected to each other by networks.

20. A design tool according to claim 16, wherein, upon verifying automatically that the indicators of freeness are preserved during the mapping, the design tool verifies that a first wire which carries a first data flow and a second wire which carries a second data flow, the first data flow and the second data flow being free, are not connected to a same connector.

* * * * *